United States Patent [19]
Kobayashi et al.

[11] Patent Number: 5,353,422
[45] Date of Patent: Oct. 4, 1994

[54] METHOD AND SYSTEM FOR STORING AND MANAGING A PLURALITY OF INFORMATION MEDIA USED BY RECORDING/REPRODUCING UNITS

[75] Inventors: Takashi Kobayashi, Kawasaki; Kenzo Kurihara, Tokyo; Takashi Doi, Hadano; Michio Miyazaki; Minoru Kosuge, both of Odawara, all of Japan

[73] Assignee: Hitachi, Ltd., Tokyo, Japan

[21] Appl. No.: 591,233

[22] Filed: Oct. 1, 1990

[30] Foreign Application Priority Data

Oct. 6, 1989 [JP] Japan ................................ 1-260022
Apr. 6, 1990 [JP] Japan ................................ 2-90319

[51] Int. Cl.$^5$ ............................................. G06F 13/00
[52] U.S. Cl. ................................. 395/425; 369/34
[58] Field of Search .................... 395/425; 369/34; 364/200 MS File, 900 MS File

[56] References Cited
U.S. PATENT DOCUMENTS 4,571,674  2/1986  Hartung ........................... 395/250
4,876,662 10/1989  Pence ............................... 364/403
5,059,772 10/1991  Younglove ....................... 235/383

Primary Examiner—David L. Robertson
Attorney, Agent, or Firm—Fay, Sharpe, Beall, Fagan, Minnich & McKee

[57] ABSTRACT

An information medium storage and management system includes storage compartments for storing a plurality of information media; a plurality of recording/reproducing apparatus each capable of accessing each of a plurality of information media, each capable of recording at least one file; handling apparatus for mounting a mount information medium on a mount recording/reproducing apparatus and demounting a demount information medium from a demount recording/reproducing apparatus; and a controller for controlling the handling apparatus to select as the mount information medium one of the plurality of information media in accordance with the use history data of each information medium, to select as the mount recording/reproducing apparatus one of unoccupied recording/reproducing apparatus of the plurality of recording/reproducing apparatus, and to cause the mount information medium to use the mount recording/reproducing apparatus for a predetermined time period.

28 Claims, 20 Drawing Sheets

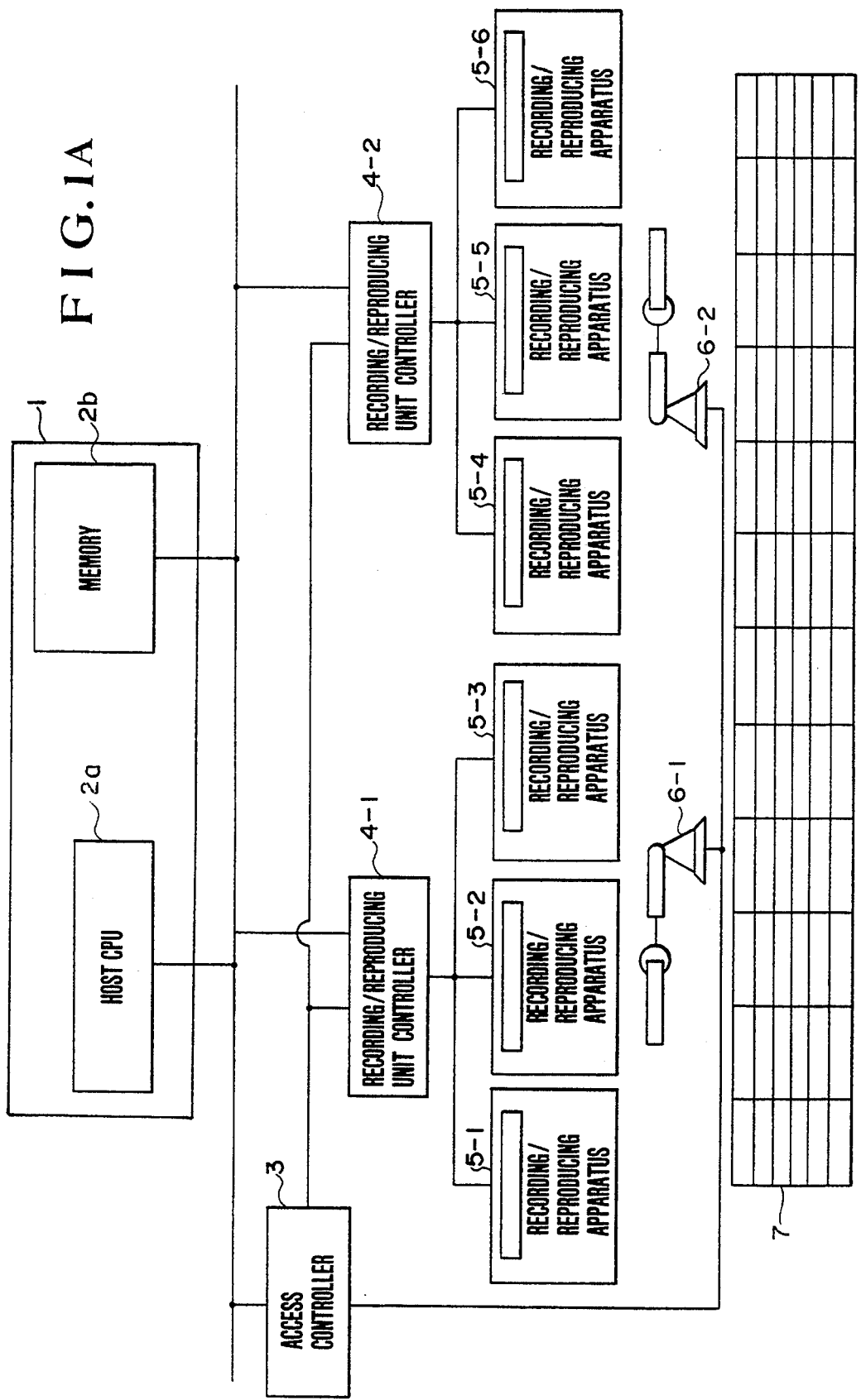

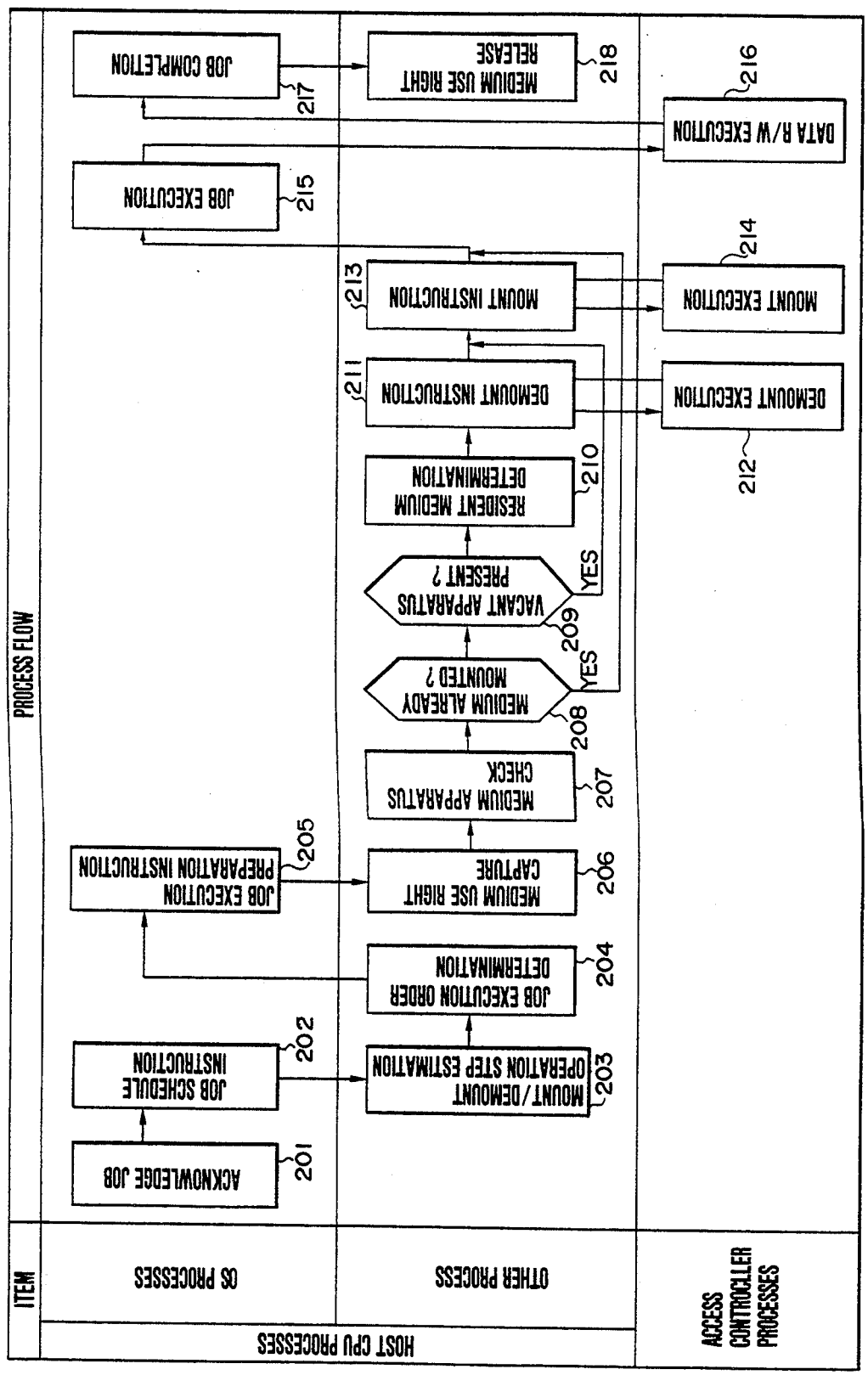

FIG. 3

| RECORDING/ REPRODUCING # | MOUNTED MEDIUM NAME | LAST USE TIME | NUMBER OF USES | MEDIUM HOME POSITION ON CUSTODY RACK | | STATUS | |
|---|---|---|---|---|---|---|---|
| | | | | X-AXIS | Y-AXIS | BUSY | TROUBLE |
| 1 | E | 8:03 | 17 | 10 | 5 | — | ○ |
| 2 | C | 11:25 | 5 | 330 | 7 | ○ | ○ |
| 3 | D | 9:36 | 3 | 95 | 8 | ○ | ○ |
| 4 | B | 13:45 | 8 | 450 | — | ○ | ○ |
| 5 | A | 19:21 | 4 | 780 | 12 | ○ | ○ |

FIG. 6

| JOB # | EXECUTION ORDER | USED FILE 1 | | | USED FILE 2 | | | USED FILE 3 | | | USED FILE 4 | | |
|---|---|---|---|---|---|---|---|---|---|---|---|---|---|
| | | FILE NAME | STORED MEDIUM | MEDIUM POSITION | FILE NAME | STORED MEDIUM | MEDIUM POSITION | FILE NAME | STORED MEDIUM | MEDIUM POSITION | FILE NAME | STORED MEDIUM | MEDIUM POSITION |
| J1 | 3 | f1 | A | APPARATUS 5 | f2 | B | APPARATUS 4 | f3 | X | PACK | f4 | Y | PACK |
| J2 | 1 | f5 | C | APPARATUS 2 | f6 | D | APPARATUS 3 | f7 | E | APPARATUS 1 | — | — | — |
| J3 | 2 | f8 | B | APPARATUS 4 | f9 | C | APPARATUS 2 | — | — | — | — | — | — |

FIG. 9

| NO | JOB EXECUTION ORDER | | | MEDIUM NAME MOUNTED ON RECORDING/REPRODUCING APPARATUS | | | | MOUNT/DEMOUNT NOMDER | | |
|---|---|---|---|---|---|---|---|---|---|---|
| | 1 | 2 | 3 | INITIAL STATE | FOR FIRST JOB EXECUTION | FOR SECOND JOB EXECUTION | FOR THIRD JOB EXECUTION | MOUNT | DEMOUNT | TOTAL |
| 1 | J1 | J2 | J3 | A,B,C,D,E | A,B,C,X,Y | D,E,C,X,Y | D,E,C,X,B | 5 | 5 | 10 |
| 2 | J1 | J3 | J2 | A,B,C,D,E | A,B,C,X,Y | A,B,C,X,Y | D,E,C,X,Y | 4 | 4 | 8 |
| 3 | J2 | J1 | J3 | A,B,C,D,E | A,B,C,D,E | A,B,C,X,Y | A,B,C,X,Y | 2 | 2 | 4 |
| 4 | J2 | J3 | J1 | A,B,C,D,E | A,B,C,D,E | A,B,C,D,E | A,B,C,X,Y | 2 | 2 | 4 |
| 5 | J3 | J1 | J2 | A,B,C,D,E | A,B,C,D,E | A,B,C,X,Y | A,B,C,D,E | 4 | 4 | 8 |
| 6 | J3 | J2 | J1 | A,B,C,D,E | A,B,C,D,E | A,B,C,D,E | A,B,C,X,Y | 2 | 2 | 4 |

FIG.10

| MEDIUM NAME | MEDIUM HOME POSITION | | CONTENTION NUMBER | STORED FILE NAME | | | | | | | MOUNT |
|---|---|---|---|---|---|---|---|---|---|---|---|
| | X-AXIS | Y-AXIS | | 1 | 2 | 3 | 4 | 5 | 6 | 7 | |
| A | 780 | 12 | 27 | f1 | f2 | f3 | f4 | f5 | | | 1 |
| B | 450 | 1 | 3 | f6 | f7 | f8 | f9 | | | | 1 |
| C | 330 | 7 | 1 | f10 | f11 | f12 | | | | | 1 |
| D | 95 | 8 | 0 | f13 | f14 | f15 | f16 | f17 | f18 | f19 | 1 |
| E | 10 | 5 | 2 | f20 | f21 | f22 | f23 | f24 | f25 | | 1 |
| F | 272 | 3 | 0 | f26 | f27 | | | | | | 0 |
| G | 174 | 8 | 1 | f28 | f29 | f30 | | | | | 0 |

FIG.11

| FILE NAME / FILE NAME | f1 | f2 | f3 | f4 | f5 |
|---|---|---|---|---|---|
| f1 | 1 | | | | |
| f2 | (7) | 0 | | | |
| f3 | 2 | (10) | 1 | | |
| f4 | 0 | 0 | (5) | 0 | |
| f5 | 0 | 0 | 0 | (1) | 0 |

FIG. 14

| NO | FILE RELOCATION SCHEME | | CONTENTION NUMBER |
| --- | --- | --- | --- |
| | FILE LEFT ON ORIGINAL MEDIUM | FILE RECOCATED TO NEW MEDIUM | |
| 1 | f1 f2 f3 f4 | | 7 + 10 + 5 = 22 |
| 2 | f2 f3 f4 | f1 | 0 + 10 + 5 = 15 |
| 3 | f1 f3 f4 | f2 | 0 + 0 + 5 = 5 |
| 4 | f1 f2 f4 | f3 | 7 + 0 + 0 = 7 |
| 5 | f1 f2 f3 | f4 | 7 + 10 + 0 = 17 |
| 6 | f1 f2 | f3 f4 | 7 + 0 + 5 = 12 |
| 7 | f1 f3 | f2 f4 | 0 + 0 + 0 = 0 |
| 8 | f1 f4 | f2 f3 | 0 + 10 + 0 = 10 |
| 9 | f3 f4 | f1 f2 | 7 + 0 + 5 = 12 |
| 10 | f2 f4 | f1 f3 | 0 + 0 + 0 = 0 |
| 11 | f2 f3 | f1 f4 | 0 + 10 + 0 = 10 |

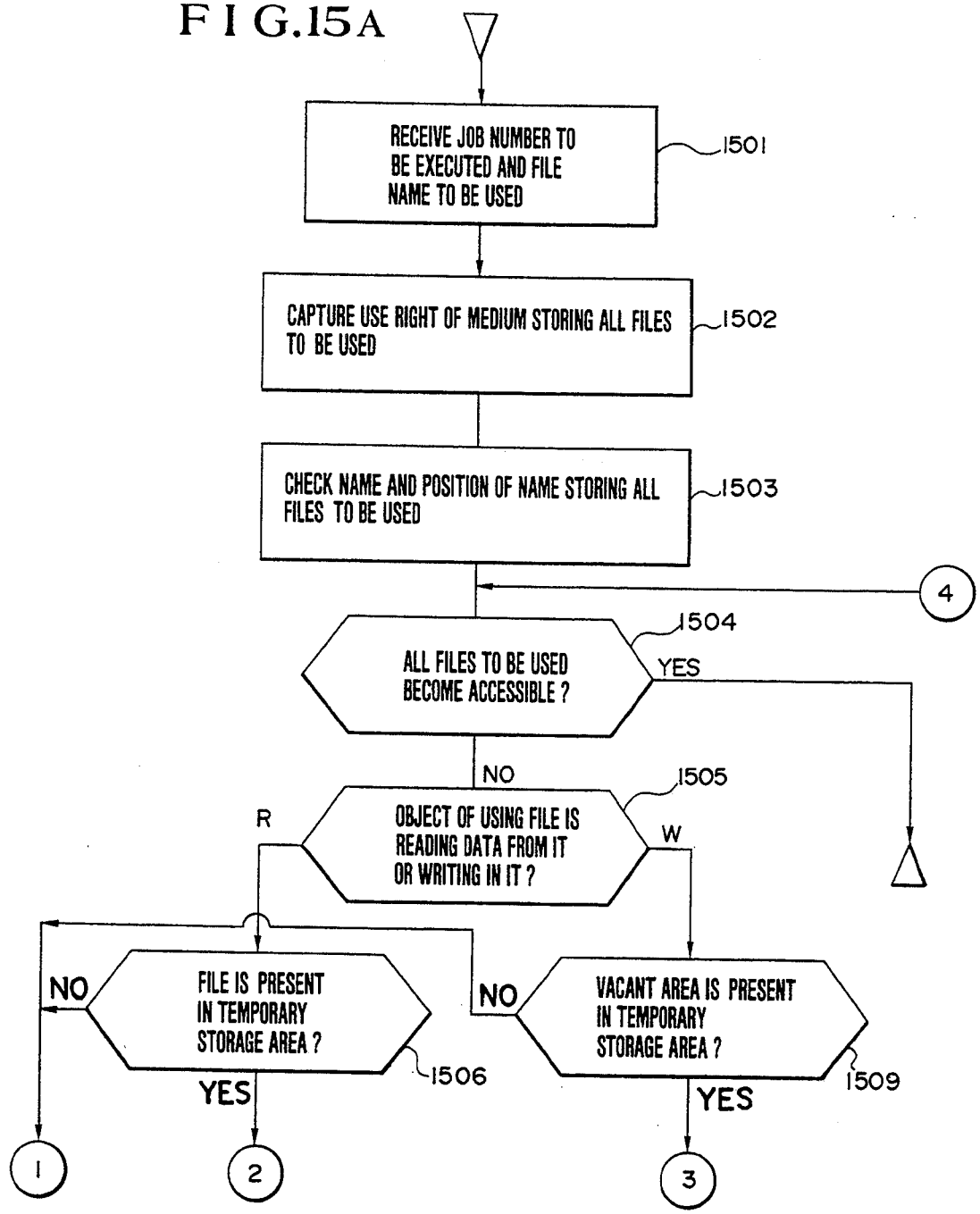

FIG. 16

| TEMPORARY STORAGE AREA NAME | NORMAL WRITE LOCATION | | TIME OF DATA STORAGE IN TEMPORARY STORAGE AREA | COMPLETED/NOT-COMPLETED OF DATA WRITE INTO NORMAL MEDIUM |
|---|---|---|---|---|
| | MEDIUM NAME | FILE NAME | | |
| TEM 1 | A | f1 | 8:40 | COMPLETE |
| TEM 2 | A | f5 | 9:00 | COMPLETE |
| TEM 3 | D | f16 | 10:30 | COMPLETE |
| TEM 4 | E | f21 | 13:02 | NOT-COMPLETE |
| TEM 5 | E | f24 | 15:00 | NOT-COMPLETE |
| TEM 6 | G | f28 | 19:01 | NOT-COMPLETE |

FIG. 17

| MEDIUM NAME | MEDIUM HOME POSITION X-AXIS | MEDIUM HOME POSITION Y-AXIS | NUMBER OF CONFLICTION DAYS | STORED FILE NAME & ASSOCIATED TEMPORARY DATA 1 | 2 | 3 | 4 | 5 | 6 | 7 |
|---|---|---|---|---|---|---|---|---|---|---|
| A | 780 | 12 | 27 | f1 TEM 1 | f2 | f3 | f4 | f5 TEM 2 | | |
| B | 450 | 1 | 3 | f6 | f7 | f8 | f9 | | | |
| C | 330 | 7 | 1 | f10 | f11 | f12 | | | | |
| D | 95 | 8 | 0 | f13 | f14 | f15 | f16 TEM 3 | f17 | f18 | f19 |
| E | 10 | 5 | 2 | f20 | f21 TEM 4 | f22 | f23 | f24 | f25 | |
| F | 272 | 3 | 0 | f26 | f27 | | | | | |
| G | 174 | 8 | 1 | f28 TEM 6 | f29 | f30 | | | | |

METHOD AND SYSTEM FOR STORING AND MANAGING A PLURALITY OF INFORMATION MEDIA USED BY RECORDING/REPRODUCING UNITS

BACKGROUND OF THE INVENTION

1. Field of the Invention

The present invention relates to a method for storing and managing information media each having large capacity such as digital video tapes and optical disks and a system for the same. More particularly, the present invention relates to a method for reducing the number of mount/demount operations of such media and improving response performance and throughput and a system for the same.

2. Description of the Related Art

On-line automation of business transactions are now progressing extensively in various fields such as money and bond markets, commodities circulation and manufacturing business. The custody amount or capacity of various data including on-line data is correspondingly increasing at high speed. In view of this, an information medium storage and management system has now become noticeable. This system uses cartridge type magnetic tapes (MTs) which are easily handled, has holding or custody racks, a plurality of recording/reproducing apparatus and handling apparatus for automatic mount-/demount operation of MTs.

A cartridge type MT has a storage capacity in the order of 200 megabytes (MB) and generally stores only one file in it. All MT media are stored on holding or custody racks. In operation of the system, when a request for processing a file is issued, the medium containing the file is mounted on a recording/reproducing apparatus by means of a handling apparatus, demounted therefrom after the end of processing, and returned to the holding or custody rack. For the information medium storage and management system using cartridge type MTs, it is important therefore to shorten the time required for medium mount/demount operation and realize high response performance and throughout.

Meanwhile, the memory density of information medium is increasing rapidly. There are known in practice large capacity information media such as used with digital VTRs and optical disks having a memory capacity of several gigabytes (GB) to several tens of gigabytes (GB) which is several tens to several hundreds times as large as that of a cartridge type MT.

The memory capacity of such a large capacity medium is considerably larger than the capacity of one file so that hundreds of files can be stored in one medium. Thus, there is a large possibility that a plurality of computer jobs used the same medium. It often happens therefore that a medium demounted after the end of processing a computer job must be mounted again upon a request for processing another computer job. If the operation scheme applied to a conventional information media automatic custody system using cartridge type MTs is used for such large capacity media, there is a high possibility that the resultant operation is inefficient at high possibility.

SUMMARY OF THE INVENTION

It is an object of the present invention to provide a system capable of shortening a medium mount-/demount operation time and achieving high response performance and throughout. According to the present invention, the time and frequency of future requests for each medium is predicted so that the medium may be controlled to be present on a recording/reproducing apparatus before a request is generated.

In order to achieve the above object, the following means are provided:

(A) Means for determining a medium to be mounted on a recording/reproducing apparatus A medium having a high possibility to be requested in the future is predicted, and the medium is controlled so as to be present for a predetermined time period at a recording/reproducing apparatus.

(B) Means for scheduling job execution

The execution order of jobs is scheduled to make as small as possible the number of mount/demount operation steps for a medium having a requested file and not present on a recording/reproducing apparatus.

(C) Means for determining file allocation to a medium

File allocation to a medium is determined such that data with a high possibility of future use is allocated to a small number of media such that a plurality of job requests can be processed in parallel as much as possible.

(D) Means for supervising a temporary storage area

If a medium requested for data write is still not mounted on a recording/reproducing apparatus, predetermined storage means or another already mounted medium is used as a temporary storage area, and thereafter the data is written in the requested medium.

If a medium requested for data read is not still mounted on a recording/reproducing apparatus, and if the data to be read is being stored in the temporary storage area, it is read not from the medium but from the temporary storage area.

According to the information medium storage and management system of this invention, data with high possibility of future use is predicted in accordance with the past and future job executions. The data is allocated to a small number of mediums which are controlled to be present for a predetermined time period at a recording/reproducing apparatus. Furthermore, optimum job scheduling is performed to enable the minimum number of medium mount/demount operation steps.

For realizing this, a scheme can be considered whereby if necessary a medium is left on a recording-/reproducing apparatus after the end of processing without unconditionally demounting it as conventional. According to this invention, if some media on an apparatus are required to be demounted because of mounting a new medium, such media are demounted in the order starting from a medium with a lowest possibility of future use, the possibility of future use being determined in accordance with the past medium use history or computer job execution scheduling.

If a medium requested for data write is not still mounted on a recording/reproducing apparatus, predetermined storage means or another already mounted medium is used as a temporary storage area, and thereafter the data is written in the requested medium.

The above scheme will be described in more particular in the following.

(1) Determining a medium to be mounted on a recording/reproducing apparatus

A medium to be requested for future processing is predicted in accordance with the past medium use history data and/or the data regarding computer job execution scheduling. In accordance with the predicted results, a medium with a high possibility of future access is controlled to be present for a predetermined time period at a recording/reproducing apparatus.

(2) Scheduling job execution

Even if some media are mounted beforehand as described in (1), there are many media not present at the recording/reproducing apparatus among those media requested by a job. From this point of view, the execution order of jobs is best scheduled to make as small as possible the number of mount/demount operation steps.

(3) Determining file allocation to a medium

In order to allow particular medium present on recording/reproducing apparatus, data with high possibility of future use is allocated concentrically to a small number of media. Although the number of mount/demount operation steps is reduced as described in (1) and (2), if jobs conflict with each other for the same medium, the response performance and throughput are deteriorated because of a stand-by time. For this reason, files are allocated to medium so as to allow parallel job execution as much as possible.

(4) Writing data into a temporary storage area

If a medium requested for data write is not still mounted on a recording/reproducing apparatus, there are used, as a temporary storage area, predetermined storage means such as memories and disks, dedicated temporary storage medium provided on recording/reproducing apparatus, or other already mounted media. Thereafter, the data is written in the requested medium.

(5) Reading data from a temporary storage area

If a medium requested for data read is not still mounted on a recording/reproducing apparatus, and if the data to be read is being stored in the temporary storage area, it is read not from the medium but from the temporary storage area.

BRIEF DESCRIPTION OF THE DRAWINGS

FIGS. 1A to 1C show the overall structure of a system of this invention;

FIG. 2 is a schematic diagram illustrating the procedure of job execution by the system;

FIG. 3 shows an example of a recording/reproducing unit management table;

FIG. 6 shows an example of a job scheduling table;

FIG. 9 is a table used for explaining the medium of calculating the number of mount/demount operations;

FIG. 10 shows an example of a medium management table;

FIG. 11 shows an example of a confliction file record table;

FIG. 14 is a table illustrating alternative file relocation schemes;

FIGS. 15A and 15B illustrate the procedure of writing data using a temporary storage area;

FIG. 16 shows an example of a temporary storage area management table;

FIG. 17 shows an example of a medium management table; and

DETAILED DESCRIPTION OF THE PREFERRED EMBODIMENTS

An information medium storage and management system of this invention will be described with reference to FIGS. 1 to 18.

Figure 1B:
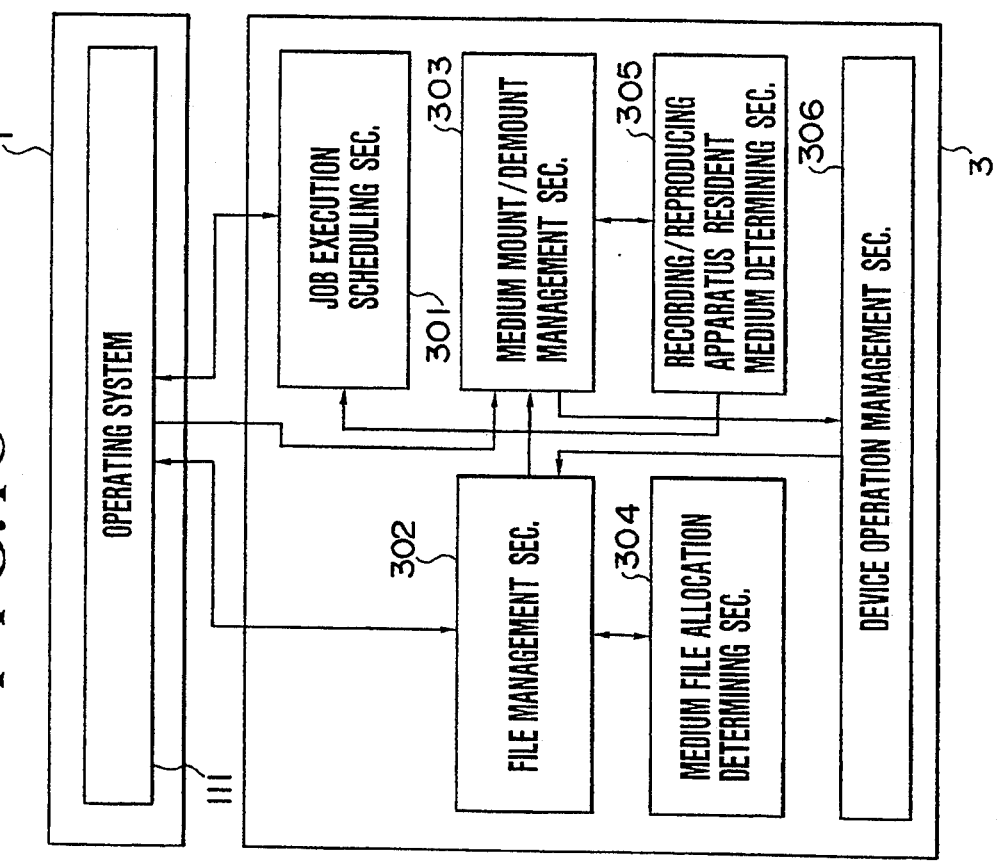
Figure 1C:
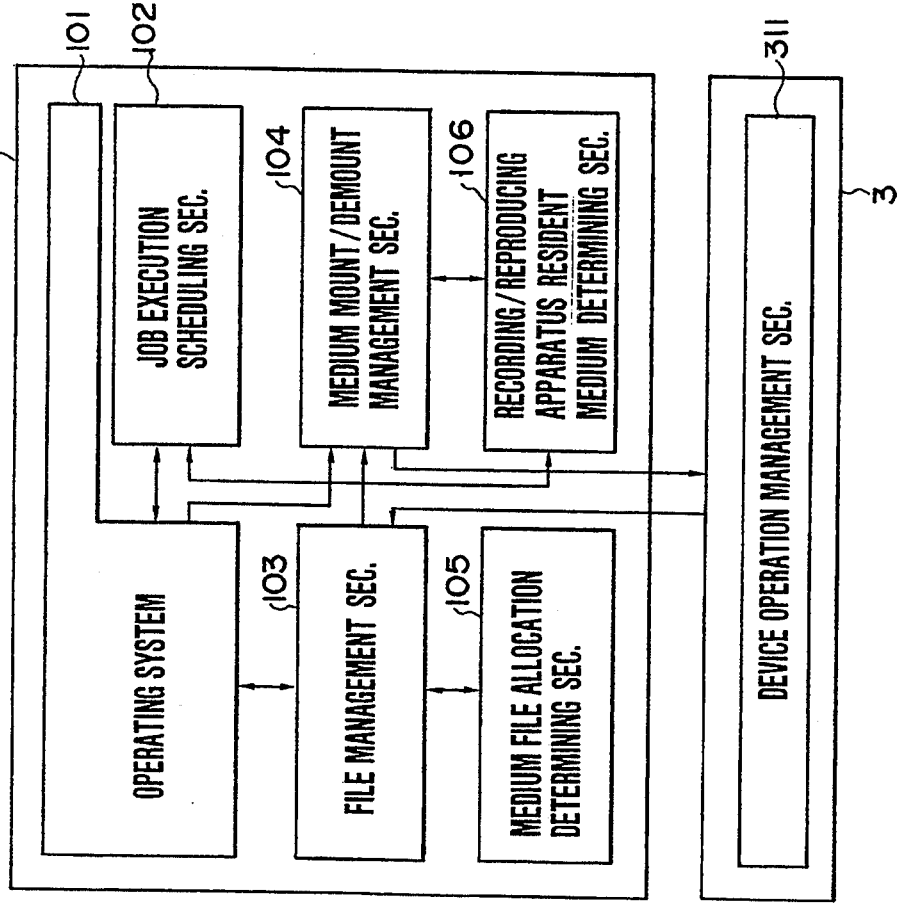
Figure 4:
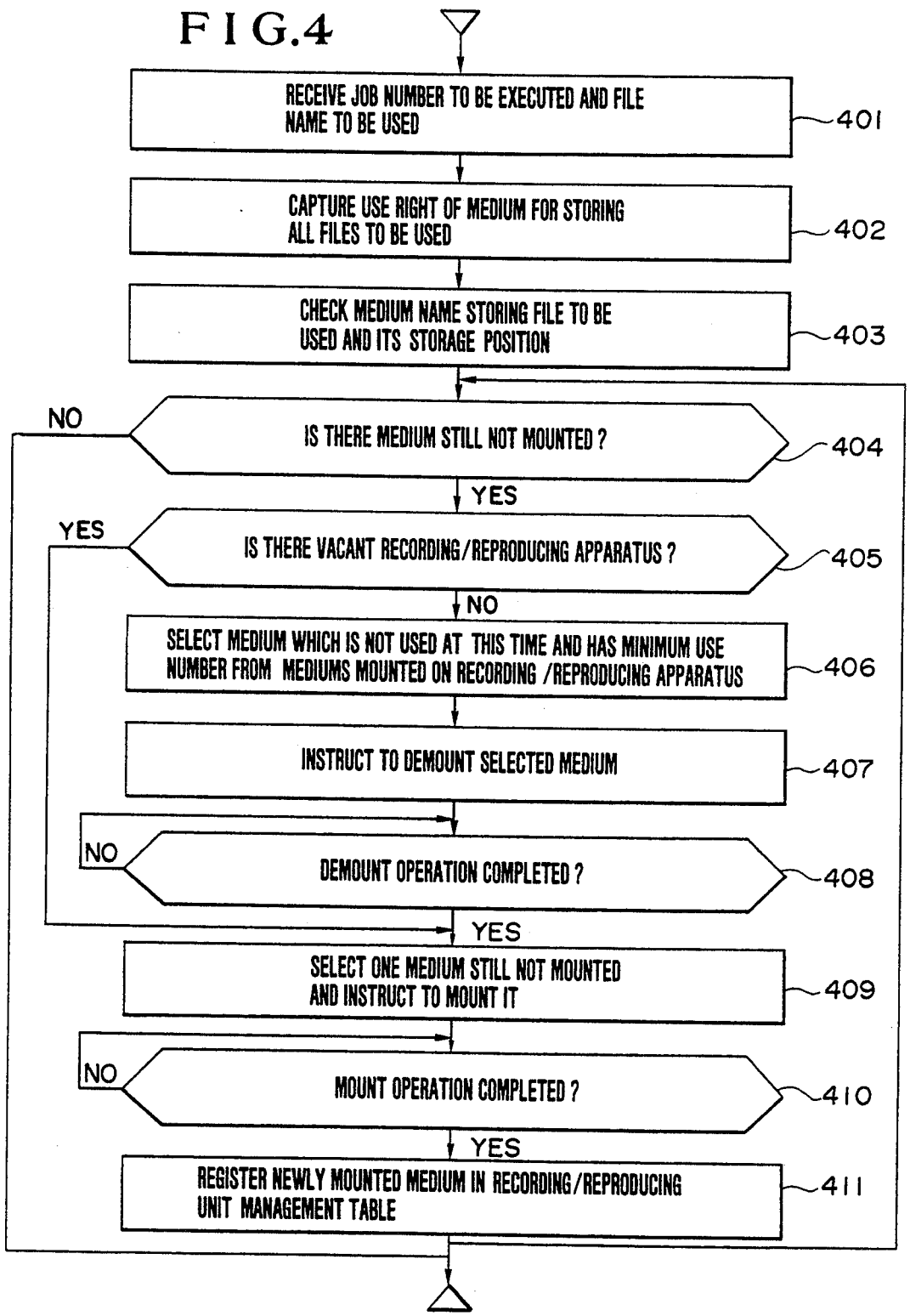
FIG. 4 illustrates the procedure of determining media to be present on recording/reproducing apparatus.

FIGS. 1A to 1C are schematic diagrams showing the configuration of the multi-file type information medium storage and management system of this invention. FIG. 1A shows the hardware arrangement, and FIGS. 1B and 1C show the software arrangement. The software arrangement of FIG. 1B is for the case where a host computer is in charge of the main part of functions of this invention, and that of FIG. 1B is for the case where an access controller is in charge of the main part of the functions. Referring to FIG. 1A, the system includes a host computer 1 having a host CPU 2a for requesting data input/output to the access controller 3 and, a memory 2b for storing various data, the access controller 3, recording/reproducing unit controllers 4-1 and 4-2, recording/reproducing units 5-1 to 5-6, medium handling units 6-1 and 6-2, and medium storage compartments 7.

In the software arrangement shown in FIG. 1B, the host computer 1 includes an operating system 101, a job execution scheduling section 102, a file management section 103, a medium mount/demount management section 104, a medium file allocation determining section 105, and a resident medium determining section 106. The controller 3 includes only a system operation management unit 311 for management of units constituting the system.

On the other hand, in the software arrangement shown in FIG. 1C, the host computer 1 is charged with only the function of executing various jobs and requesting input/output to the controller 3. The controller 3 on the other hand includes a job execution scheduling section 301, a file management section 302, a medium mount/demount management section 303, a medium file allocation determining section 304, a resident medium determining section 305, and a system operation management section 306.

FIG. 2 illustrates briefly the procedure of a data read/write operation by the information medium storage and management system oft this invention, wherein the software arrangement shown in FIG. 1B is assumed to be applied. "Other processes" at the middle row in FIG. 1B are executed by the host CPU. If the software arrangement shown in FIG. 1C is to be applied, the "other processes" are executed by the controller 3.

The procedure executed by the system will be described based upon the software arrangement shown in FIG. 1B.

STEP 201 (job execution request):

The operating system 101 acknowledges a job execution request from a user and registers it in an execution request acknowledge table.

STEP 202 (job scheduling instruction):

The operating system 101 first confirms from a recording/reproducing unit management table shown in FIG. 3 that all information mediums necessary for the job execution are not now in use and the recording/reproducing units on which the mediums are to be mounted are not now in a busy state. Only a job satisfying the above two conditions is used as a candidate for scheduling. The operating system 101 then instructs the job execution scheduling section 102 to schedule the job so as to ensure the minimum number of medium mount-/demount operation steps.

STEP 203 (mount/demount step number estimation):

The section 102 generates substitutive schemes for job execution order and estimates the number of mount-/demount operation steps for every scheme.

STEP 204 (job execution order determination):

The execution order in that the number of steps is minimal is selected and informed to the operating system 101.

STEP 205 (job execution preparation instruction):

The operating system 101 determines a job to be next executed in accordance with the informed information, and instructs the medium mount/demount management section 104 to prepare media used in the job execution.

STEP 206 (medium use permission acquisition):

The section 104 checks files required for the job execution, and acquires permission for exclusively using the media storing such files from other jobs.

STEP 207 (medium location check):

It is checked where any of the media used in the job execution is mounted on a recording/reproducing unit or on a storage compartment.

STEP 208:

If all the mediums to be used are being mounted on recording/reproducing units, the control advances to step 215. If not, the control advances to step 209 in which media still on the storage compartments are mounted on the recording/reproducing unit.

STEP 209:

If there is any vacant recording/reproducing unit without a medium mounted thereon, the control advances to step 213 to mount one of the media on the vacant unit. If not, the control advances to step 210 in which one of already mounted media is demounted from mounted units.

STEP 210 (resident medium determination):

There are estimated possibilities that use of each of the already mounted media is requested in future. Media with higher possibilities are left on the mounted recording/reproducing units, and the medium with the lowest possibility is used as an object to be demounted.

STEP 211 (demount instruction):

The controller 3 is instructed to execute a demount operation for the selected medium.

STEP 212 (demount execution):

The controller 3 executes the instructed demount operation. After completion of the demount operation, the control is returned to the medium mount/demount management section 104.

STEP 213 (mount instruction):

In order to mount the medium on the recording/reproducing unit now vacant by the above step, the section 104 instructs the controller 3 to execute a mount operation of a necessary medium.

STEP 214 (mount execution):

The controller 3 executes the instructed mount operation. After completion of the mount operation, the control is returned to the section 104. By the above steps, the job execution becomes ready so that the section 104 passes the control to the operating system 101.

STEP 215 (job execution):

The operating system 101 executes the job which has been in a state for waiting for the necessary media to be mounted. If a data read/write operation is requested during the job execution, the read/write operation is instructed to the controllers.

STEP 216 (data read/write execution):

The controller 3 controls the recording/reproducing unit to execute the instructed read/write operation.

STEP 217 (job termination):

After execution of the job, the operating system 101 executes a post-process and thereafter instructs the medium mount/demount management section 104 to execute post-processes of the media used.

STEP 218 (medium use right release):

The section 104 releases the use right of all the media used. In this case, the media used are not demounted but left on the recording/reproducing units.

At step 205, if a particular recording/reproducing unit has been designated for a medium requested in a job execution, although it is informed to a device originating such designation that the designated unit is used a recording/reproducing unit selected in the following way is actually used.

(1) If the requested medium is already mounted on a recording/reproducing unit, this unit is used for the requested medium.

(2) If the requested medium is not still mounted on any recording/reproducing unit and there is a vacant recording/reproducing unit, this vacant unit is used for the requested medium.

(3) If the requested medium is not still mounted on any recording/reproducing unit and there is no vacant recording/reproducing unit, the unit determined to be demounted in step 210 is used for the requested medium.

The description will be directed to the following three schemes which are the characteristic features of this invention, including:

(1) a scheme for determining a medium to be left on a recording/reproducing unit;
(2) a scheme for scheduling job execution; and
(3) a scheme for determining file allocation to medium.

Scheme for determining a medium to be left on a recording/reproducing unit

In order to improve the response performance of the information medium storage and management system, it becomes necessary to first predict which medium is likely to be requested for processing in the future, and then leave the medium having a high possibility of the future request, on a recording/reproducing unit. In this embodiment, such prediction is carried out in accordance with the following two methods:

(1) Prediction method on the basis of last use time of a medium

In general, it is in fact that new data stored in a medium is more often used that old data. In view of this, the last use time of a medium mounted on each recording/reproducing unit is registered in a recording unit management table in the controller 3. In determining a medium to be demounted, the medium is selected in the order of older use time.

(2) Prediction method on the basis of use frequency of a medium

The use frequency of each medium is registered, which is more straight forward than the above prediction using the last use time. In determining a medium to be demounted, the medium is selected in the order of smaller use frequency.

In order to realize the above two methods, it is necessary, as shown in FIG. 3, to register actual use history data of each medium mounted on each recording/reproducing unit, the history data including the last use time, the use frequency and the like. The procedure of determining a medium to be left in accordance with the use history data will be described with reference to FIG. 4. The procedure described below is a detailed version of the procedure from step 206 to step 213 shown in the schematic procedure diagram of FIG. 2.

STEP 401 (file name reception):

The medium mount/demount management section 104 receives a name of a job to be executed and names of files to be used in the job, from the operating system 101.

STEP 402 (medium use right acquisition):

It is checked which medium stores a file to be used, and there is acquired a right of exclusively using the medium from other jobs.

STEP 403 (medium position check):

It is checked whether the medium to be used is being mounted on a recording/reproducing unit or is still in a storage compartment.

STEP 404:

If there is a medium still not mounted among medium to be used, the control advances to step 405. If all the media to be used are already mounted, the control is terminated.

STEP 405:

If there is a vacant recording/reproducing unit on which a medium is still not mounted, the control advances to step 409 in which a medium is mounted on the vacant unit. If there is no vacant unit, the control advances to step 406.

STEP 406 (resident medium determination):

Referring to the recording/reproducing unit management table shown in FIG. 3, the last use time of a medium mounted on each recording/reproducing unit is checked to select the medium which is not used for the associated job and has the oldest use time.

STEP 407 (demount instruction):

The controller 3 is instructed to execute the demount operation of the selected medium.

STEP 408:

The completion of the demount operation is waited for.

STEP 409 (mount instruction)

There is selected one medium which is used in the associated job but is still not mounted. A mount operation of the selected medium is instructed to the controller 3.

STEP 410:

The completion of the mount operation is waited for.

STEP 411 (updating the management table for mediums mounted on apparatus):

After the demount/mount operation, the management table shown in FIG. 3 is updated in accordance with information on the newly mounted medium. The control then returns to step 404.

Figure 5:
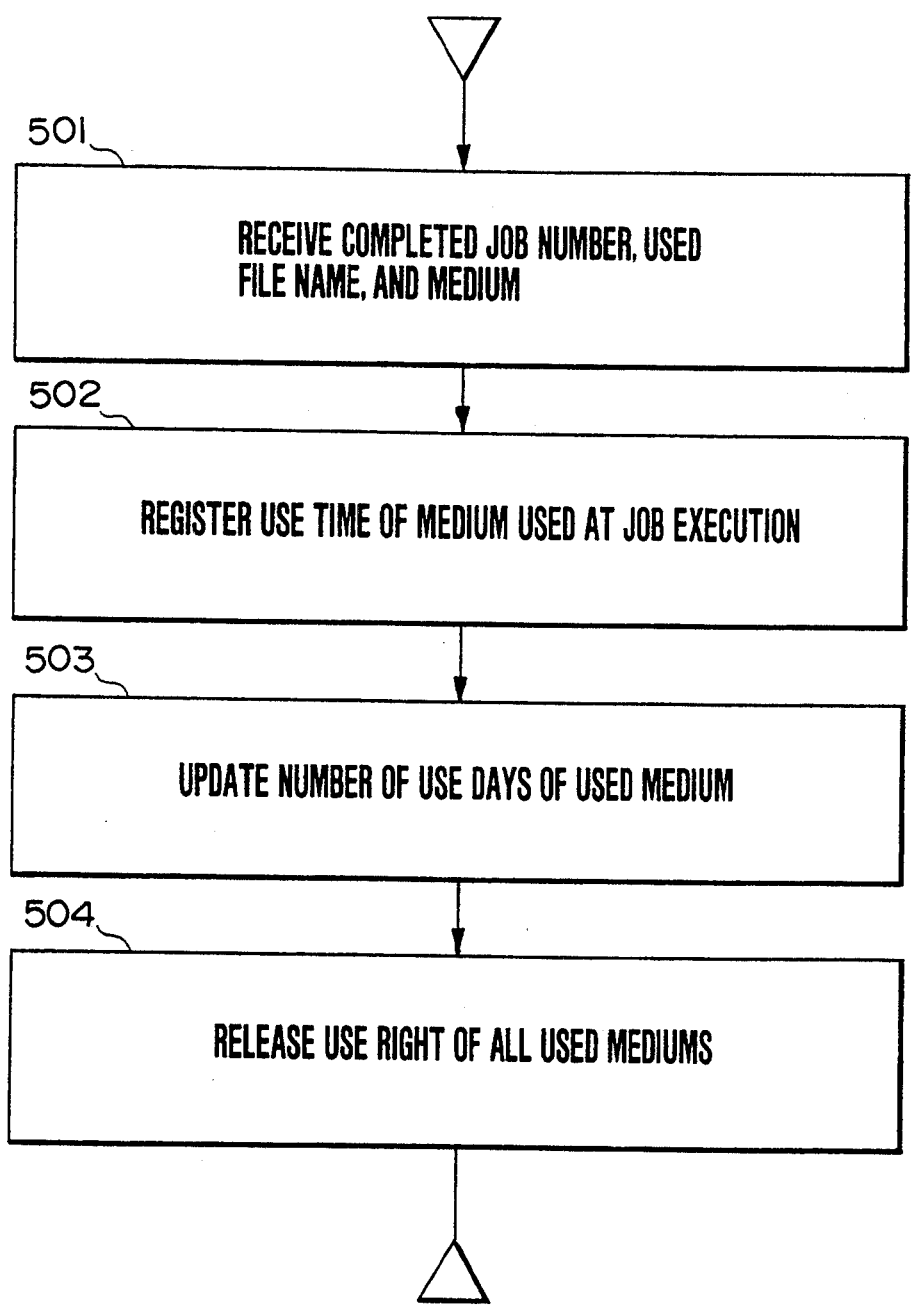
FIG. 5 illustrates the procedure of registering the past medium use data in the medium management table.

Next, the description will be given for the procedure of updating data of the last use time and the use frequency in the recording/reproducing unit management table, with reference to FIG. 5. This procedure is a detailed version of the procedure from step 217 to step 218 shown in the schematic procedure diagram of FIG. 2.

STEP 501 (reception of information concerning completion of job):

The medium mount/demount management section 104 receives from the operating system 101 the name of a completed job, the names of used files, and the name of a medium storing the files.

STEP 502 (updating last use time data):

The received medium name is searched in the recording/reproducing unit management table, the last use time data in the record concerning the medium is updated to the current time.

STEP 503 (updating use frequency):

The value of the use frequency data of the same record is incremented by "1".

STEP 504 (medium use right release):

The use right for all the media used is released.

Scheme for scheduling job execution

There will be many media not present on recording/reproducing unit necessary for jobs even if resident media are determined in accordance with the above scheme. In such a case, in order to make the number of mount/demount operation steps minimal, the execution order of jobs is scheduled most properly. The job group which satisfies the following two conditions is selected among the jobs which are supervised by the operating system 101 and wait for the execution and the selected job group are scheduled.

A job having the highest priority or of a job executable before the job having the highest priority; and The total number of jobs to be scheduled does not exceed a predetermined value.

In this embodiment, scheduling is made by the following two methods:

(1) A method by which a job having the minimum number of mount/demount operation steps of given the highest priority:

The number of mount/demount operations is estimated before the execution of each job to be scheduled. The job having the minimum estimated value is executed with the highest priority.

(2) A method by which the execution order is determined based upon the minimum total number mount/demount operation steps:

The total number of mount/demount operation steps are estimated for all of n! permutations of the execution orders of n jobs to be scheduled. Jobs are executed in the order of the estimated minimum total number.

In order to implement the above two methods, it is necessary to record the name of a file used by each job to be scheduled, an information medium in which the file is stored, and a storage compartment in which the medium is stored, as shown in FIG. 6.

Figure 7:
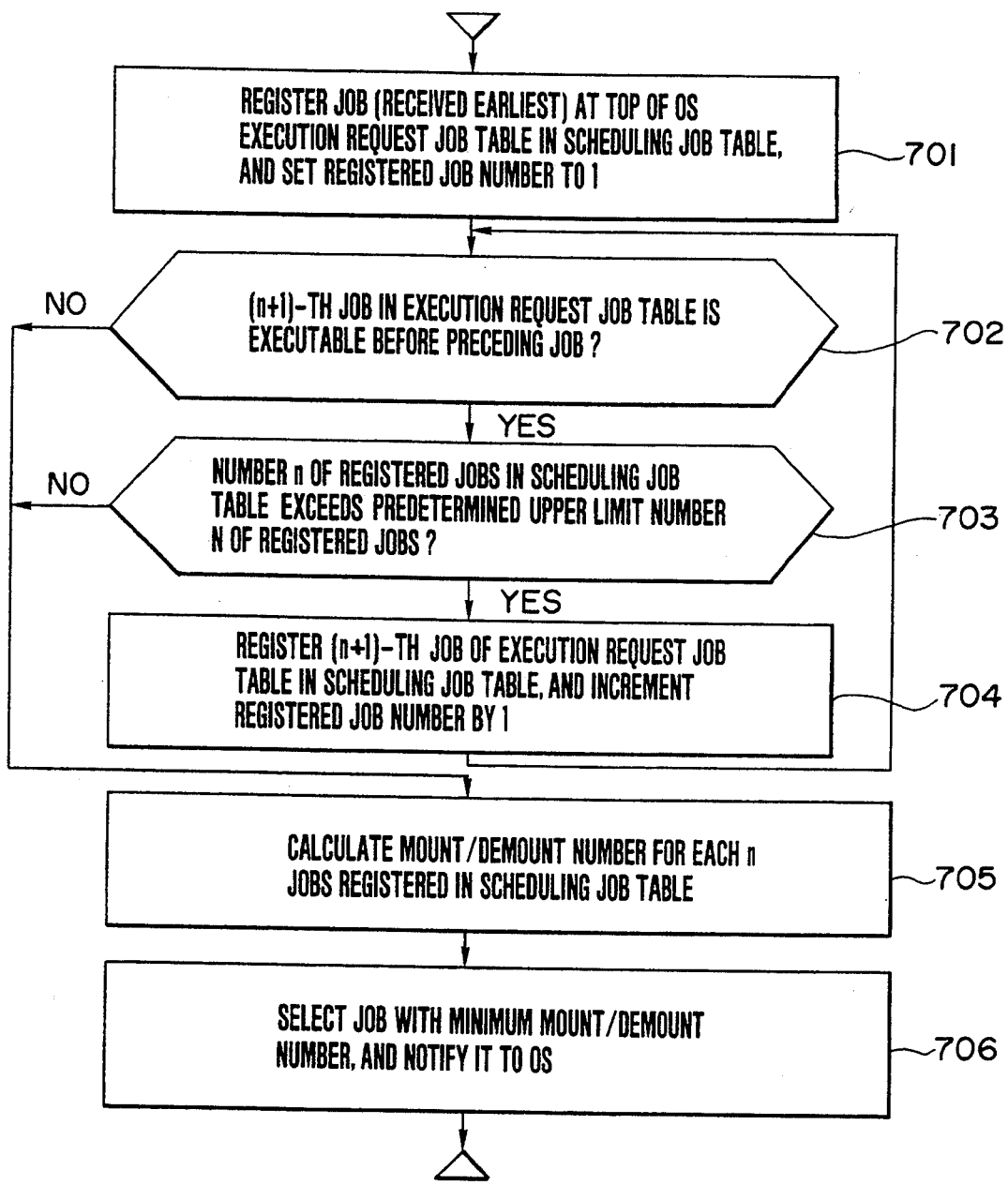
FIGS. 7 and 8 illustrate the procedure of job execution scheduling.

First, with reference to FIG. 7, there will be described the scheduling procedure using the method by which a job having the minimum number of mount/demount operation steps is given the highest priority. The procedure herein described is a detailed version of steps 203 to 204 of the schematic procedure diagram shown in FIG. 2.

STEP 701 (initial registration of jobs to be scheduled):

A job having the highest priority or a job executable before the job having the highest priority is selected among a job group which is supervised by the operating system 101 and waits for the execution. The selected job is registered in the job scheduling table shown in FIG. 6, which is provided in the controller 3, and the number n of registered jobs is set to "1".

STEP 702:

A job having the next highest priority, i.e., (n+1)-th priority, is selected from the job group waiting for the execution. It is checked whether or not the selected job is executable before the job already registered in the job scheduling table. If executable, the control advances to step 703. If not, the job registration is terminated and the control advances to step 705.

STEP 703:

If the total number of jobs already registered in the job scheduling table does not exceed a predetermined number N, the control advances to step 704. If not, the job registration is terminated and the control advances to step 705.

STEP 704 (additional registration of jobs to be scheduled):

The job having the (n+1)-th priority and waiting for the execution is additionally registered in the job scheduling table. The number n of registered jobs is incremented by "1", and the control returns to step 702.

STEP 705 (calculation of the number of mount-/demount operation steps for each job):

There is calculated the number L of mount/demount operation steps for each of n jobs registered in the table. The calculation is carried out by the following equation:

L = (the total number of operation steps necessary for demounting media) + (the total number of operation steps necessary for mounting media to be used) = (the number R of media to be used in storage compartments) × 2

STEP 706 (determination of a job to be executed):

A job having the minimum number L of mount-/demount operation steps is selected and notified to the operating system 101.

Figure 8:
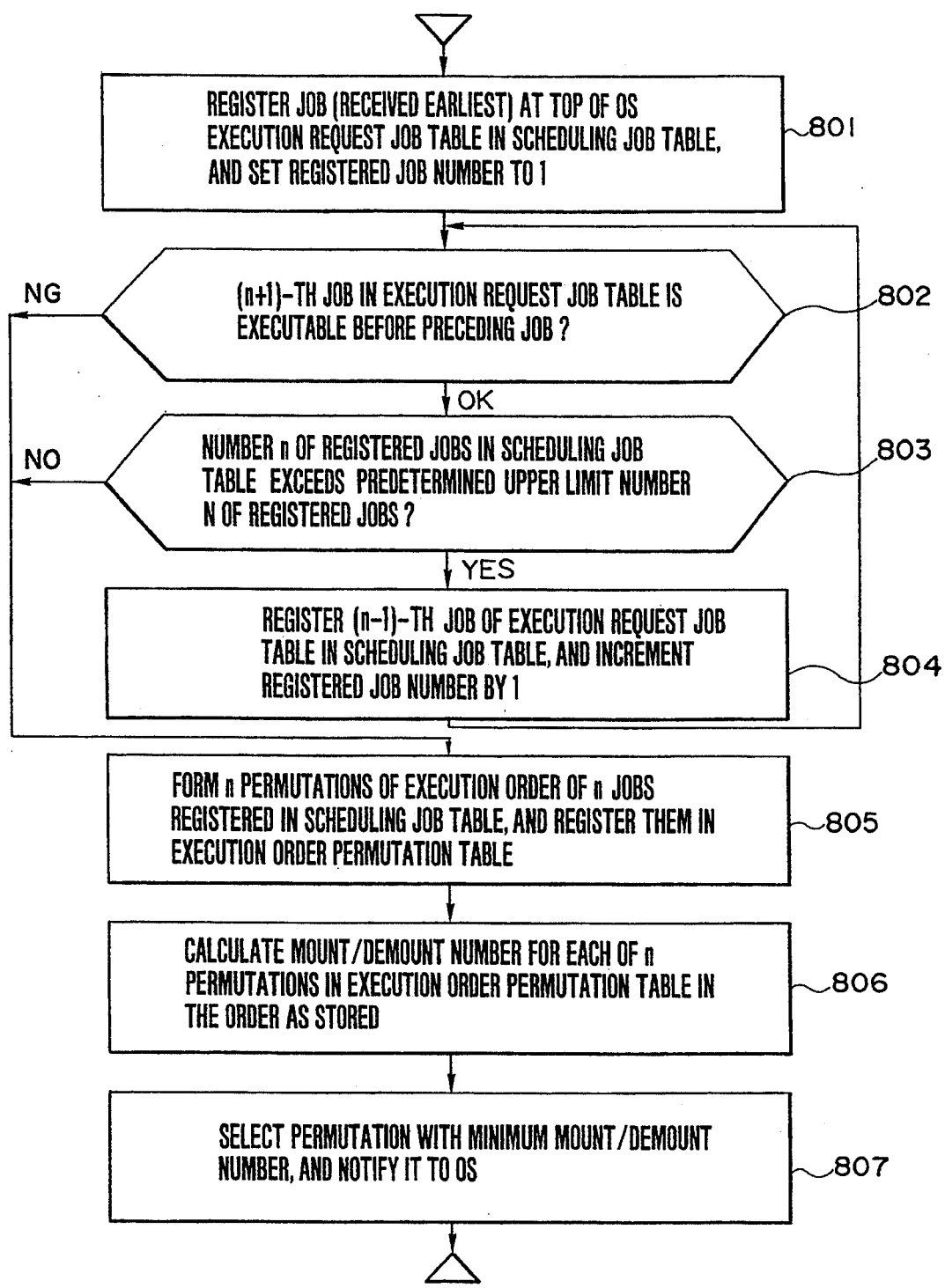

Next, with reference to FIG. 8 there will be described the scheduling procedure by the method by which the execution order is determined based upon the minimum total number of operation steps. Steps 801 to 804 are the registration procedure for jobs to be scheduled, and the same procedure as steps 701 to 704 described above, so only step 805 and the following steps will be described below.

STEP 805 (derivation of permutations of job execution order):

The execution orders of n! permutations of n jobs registered in the job scheduling table are generated and registered in a work table. For example, the generated permutations of execution orders for three jobs J1, J2 and J3 registered in the job scheduling table shown in FIG. 6, is 3!=6, as shown in FIG. 9.

STEP 806 (calculation of mount/demount operation step number):

There is calculated the total number T of mount-/demount operation steps for each permutation registered in the work table when the associated jobs are executed in such permutation order. This total number can be calculated by sequentially checking which media are to be mounted on or demounted from the recording-/reproducing unit in execution of the jobs.

For instance, consider the case where there are three jobs J1, J2 and J3 to be scheduled and there are five recording/reproducing units on which media A, B, C, D and E are mounted at the initial state. As shown in the first row of FIG. 9, in order to execute the jobs J1, J2, and J3 in this order, media on the recording/reproducing units are mounted and demounted, as illustrated in the first row of FIG. 9. In this case, it is assumed that demounting the media is carried out in the order of older use time. As shown in FIG. 9, the job execution requires five mount operation steps and five demount operations, totaling 10 operation steps.

STEP 807 (determination of job execution order):

An execution order having the minimum total number T of mount/demount operation steps is selected and notified to the operation system 101.

Scheme for determining file allocation to a medium

Although the mount/demount operation steps can be reduced through resident medium optimization and job execution scheduling, if jobs conflict with each other for the same medium, the response performance is deteriorated due to the stand-by time. In view of this file allocation to media must be determined so as to ensure parallel processing of jobs as much as possible. More in particular, it is supervised whether or not there is some medium for which a plurality of jobs conflict with each other. If there is such a medium, a part or all of files stored in such a medium are relocated to other media.

In this embodiment, there will be provided with a method of transferring a part of files stored in a medium which is likely to be conflicted, to another new medium with no file stored therein. In order to implement this method, it is necessary, as shown in FIG. 10 to provide a medium confliction management table, which represents how many times the medium use request from a plurality of jobs conflicted with each other, with respect to all media in the system. It is also necessary to provide the detailed information regarding the cause of confliction, i.e., the information regarding how many times the use requests for a file and another file occurred at the same time, as shown in FIG. 11.

Figure 12:
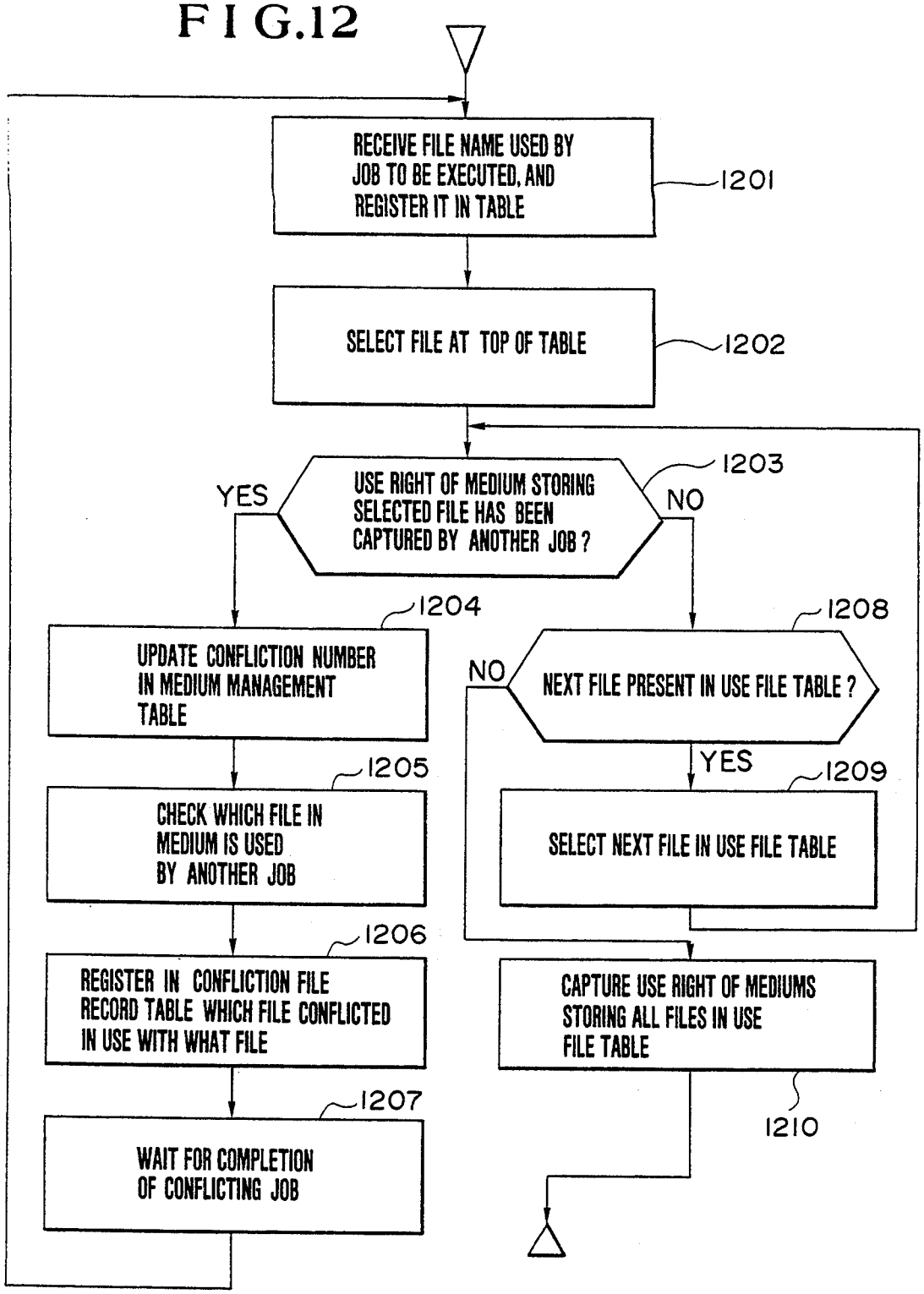
FIG. 12 illustrate the procedure of recording history data regarding medium confliction occurrence.

With reference to FIG. 12, there will be described the procedure of recording the history of medium use request confliction in the medium management table of FIG. 10 and in the confliction record table of FIG. 11, both the tables being provided in the controller 3. This procedure is a detailed version of step 206 of the schematic procedure diagram of FIG. 2 and a detailed version of steps 401 and 402 of FIG. 4.

STEP 1201 (reception of file name in use):

The name of a job to be executed and the name of the file to be used are inputted from the operating system 101 and the file names are registered in a work table.

STEP 1202:

The file name at the top of the file names registered in the work table is selected.

STEP 1203:

It is checked whether or not the use right of a medium storing a file having the selected file name has been acquired by another job. If the use right has been acquired by another job, the control advantages to step 1204 in which the history data of medium confliction is updated. If not, the control advances to step 1208 in order to execute a similar process as above with respect to another file registered in the work table.

STEP 1204 (updating medium management table):

In the medium management table shown in FIG. 10, the number of conflictions on a medium by the use request from another job is incremented by "1".

STEP 1205 (checking file name conflictingly accessed by another job):

It is checked which file in a medium is conflictingly accessed by another job.

STEP 1206 (updating confliction file record table):

In the confliction record table shown in FIG. 11, the value is incremented by "1" at the intersection between a file name in concern and the file name conflictingly accessed by the another job.

STEP 1207 (wait for completion of another contending job):

It is waited until the another job is terminated to release the necessary medium use right. When the completion of the another job is notified, the control returns to step 1201.

STEP 1208:

If the use right of a medium storing a file in concern is not being acquired by the another job, it is checked whether or not there is another file to be used in the work table. If there is the another file, the control advances to step 1209, whereas if not, the control advances to step 1210.

STEP 1209:

After selecting the next file name in the work table, the control returns to step 1203.

STEP 1210 (acquisition of a medium use right):

For all files corresponding all the file name in the work table, the use right of the medium storing the files is acquired:

Next, with reference to FIG. 13, there will be described the procedure of searching a medium likely to be conflicted and the procedure of relocating a part of files in order to eliminate confliction, respectively by using the medium management table of FIG. 10 and the confliction record table of FIG. 11.

STEP 1301 (detecting confliction medium):

Referring to the medium management table, a medium is searched which has a larger number of occurrences of use request confliction than a predetermined value. Assuming that the value is 20, the medium A in FIG. 10 is judged as being likely to be conflictingly used.

STEP 1302:

It is checked whether or not there is a medium satisfying the above condition. If there is such a medium, the control advances to step 1303, whereas if not, the control is terminated.

STEP 1303 (detecting a pair of conflictingly accessed files):

The medium is selected satisfying the condition at step 1301 and the confliction record table of the selected medium is referenced to. For example, three pairs of f1 and f2, f2 and f3, and f3 and f4 are judged as files to be likely to be conflictingly accessed.

STEP 1304:

It is checked whether or not there is a pair of files satisfying the above condition. If there is such a pair, the control advances to step 1305, whereas if not, the control returns to step 1301, in which another medium is processed.

STEP 1305 (registration of conflictingly accessed files):

The file names of a pair of files likely to be conflictingly accessed as detected at step 1303 are registered in a work table. The total number of registered files is set to Nf. In the example shown in FIG. 11, files f1, f2, f3 and f4 are registered in the work table and the total number Nf of registered files is set to "4".

STEP 1306 (generation file relocation schemes):

There are generated schemes for relocating a part of files registered in the work table to a new medium, under the restriction of Nf/2 or less files. In the example shown in FIG. 11, the following three kinds of schemes can be generated, resulting in eleven schemes in total.

a scheme without file relocation . . . 1
a scheme with one file relocation . . . 4
a scheme with two file relocation . . . 6

The contents of each file relocation are shown in FIG. 14.

The reduced number of conflictions for each scheme is calculated. The calculation is performed in the following manner.

If a pair of conflictingly accessed files is distributed to two media after the file relocation, the number of conflictions for such a pair is made null.

If a pair of conflictingly accessed files is present at one medium after the file relocation, the number of conflictions for such a pair remains unchanged.

Figure 13:
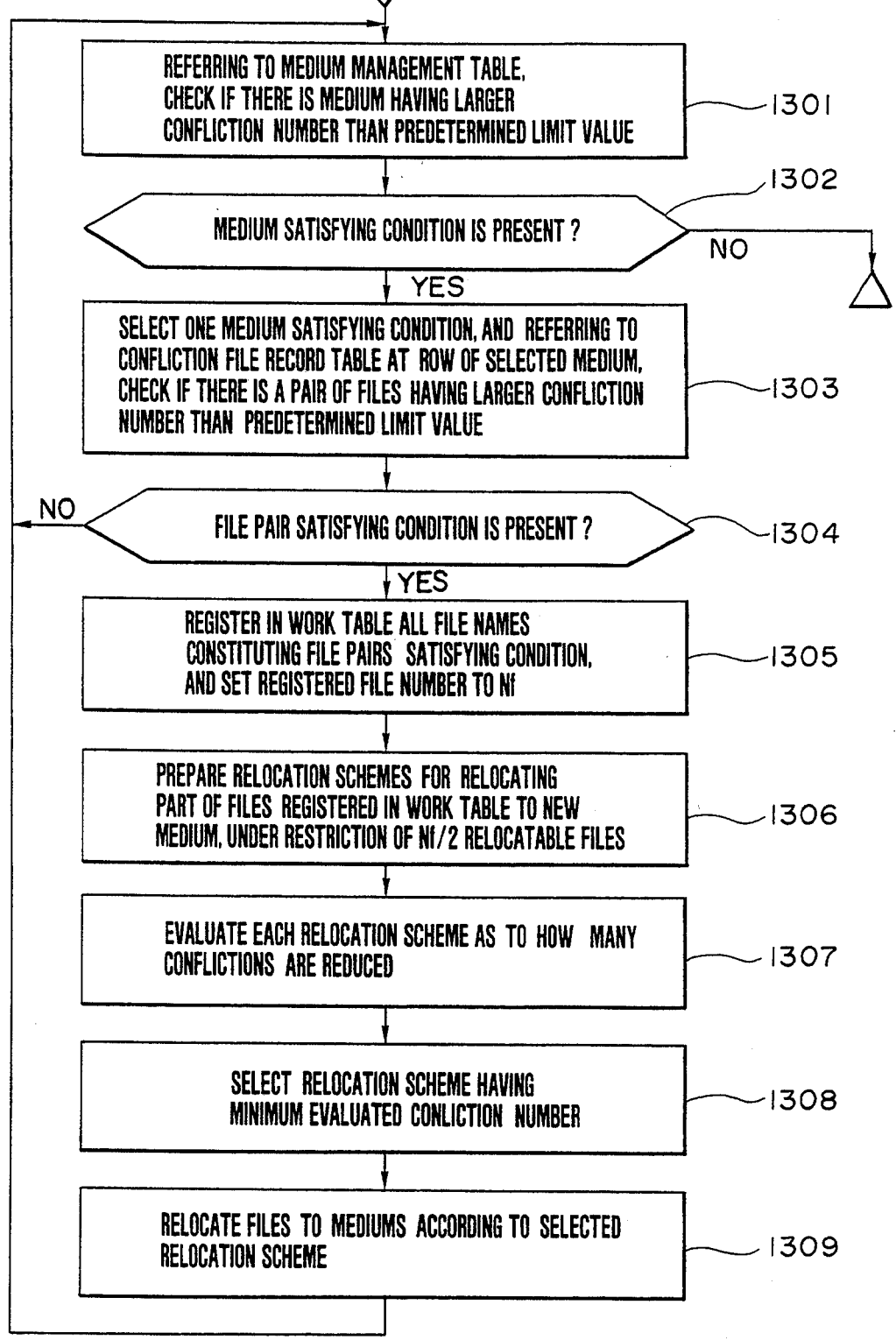
FIG. 13 illustrate the procedure of detecting media likely to be conflicted and eliminating confliction.

The evaluation procedure for each scheme is illustrated in FIG. 13.

Next, there will be described a method of using another medium mounted on a recording/reproducing unit or other storage means as a temporary storage area when a medium into which data is to be written is not present on the recording/reproducing unit.

Figure 15B:
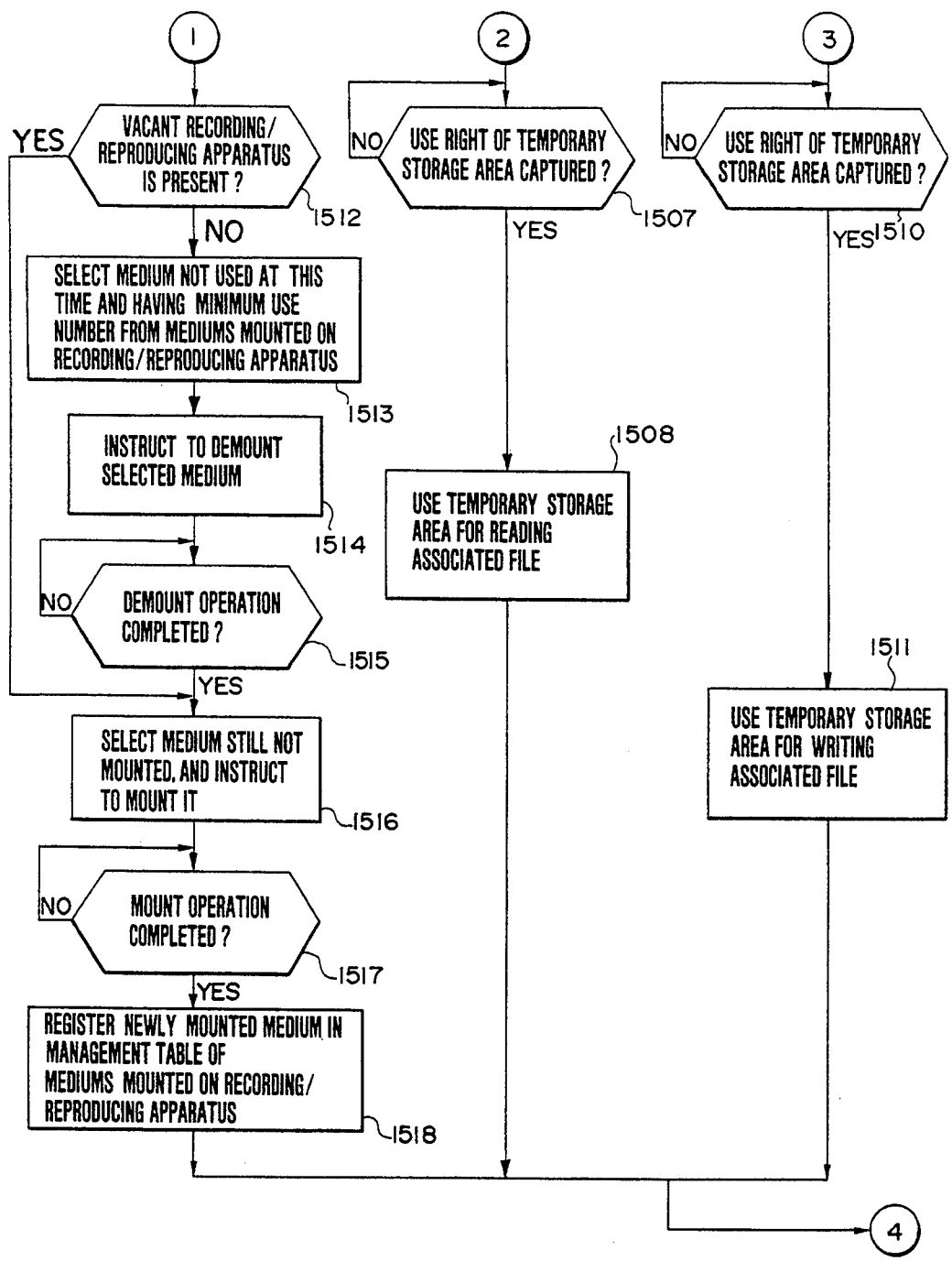

First, with reference to FIGS. 15A and 15B, there will be described the procedure of temporarily storing the data requested to be written from the upper computer 1 in another medium already mounted on a recording/reproducing unit, instead of storing it in the designated medium. FIG. 16 shows a temporary storage area management table used for the indication of what file is stored in a medium for temporary storage (hereinafter, called a temporary storage area in this specification), and FIG. 17 shows a file allocation management table used for the indication of what file is stored in one of mediums. This procedure is also applicable to the case where storage means such as memories and disks are used as the temporary storage area.

STEP 1501 (reception of file name to be used):

The name of a job to be executed and the name of a file to be used are received from the operating system 101.

STEP 1502 (acquiring a medium use right):

Media storing files to be used are searched, and the use right of each medium is acquired exclusively from other jobs.

STEP 1503 (medium position check):

It is checked whether each medium to be used is being mounted on a recording/reproducing unit or is still on a storage compartment.

STEP 1504:

If there is a medium still not mounted and storing some files to be used, one of the files is selected and the control advances to step 1505. If not, the control is terminated.

STEP 1505:

It is checked whether the selected file is read-accessed or write-accessed. For the read operation, the control advances to step 1506, whereas for the write operation, the control advances to step 1509.

STEP 1506:

Referring to the file allocation management table shown in FIG. 17, it is checked whether or not the selected file is stored in the temporary storage area. If stored, the control advances to step 1507, whereas if not, the control advances to step 1512.

STEP 1507:

A use right of the temporary storage area is acquired.

STEP 1508:

The selected file is read not from the associated medium but from a predetermined address of the temporary storage area. This address is also obtained by referring to the file allocation management table. Thereafter, the control returns to step 1504.

STEP 1509:

Referring to the temporary storage area management table shown in FIG. 16, it is checked whether or not there is a vacant area in the temporary storage area for writing the requested data. If there is a vacant area, the control advances to step 1510, whereas if not, the control advances to step 1512.

STEP 1510:

A use right of the temporary storage area is acquired.

STEP 1511:

The selected file is written not in the associated medium but in the temporary storage area at a vacant area address. This address is also obtained by referring to the temporary storage area management table. The control thereafter returns to step 1504. Steps 1512 to 1518 are the same as steps 405 to 411 of FIG. 4, as in the following.

STEP 1512:

If there is a vacant recording/reproducing unit on which a medium is not still mounted, the advances to step 1516 in which the medium is mounted on the vacant apparatus. If there is no vacant apparatus, the control advances to step 1513.

STEP 1513 (resident medium determination):

Referring to the recording/reproducing unit management table, the last use time of each medium mounted on a recording/reproducing unit is checked to select a medium which is not used for the associated job and has the oldest use time.

STEP 1514 (demount instruction):

The controller 3 is instructed to execute a demount operation of the selected medium.

STEP 1515:

The completion of the demount operation is waited for.

STEP 1516 (mount instruction):

There is selected one medium which is used in the associated job and is still not mounted. A mount operation of the selected medium is instructed to the controller 3.

STEP 1517:

The completion of the mount operation is waited for.

STEP 1518 (updating the recording/reproducing unit management table):

After the demount/mount operation, the management table of FIG. 3 is updated in accordance with the information on the newly mounted medium. The control then returns to step 1504.

After all files necessary for the job execution are made accessible in the above procedure, the job is executed. After completion of the job execution, the data regarding the file names in the medium management table is updated. The data regarding the files in the temporary storage area management table is also updated.

Figure 18:
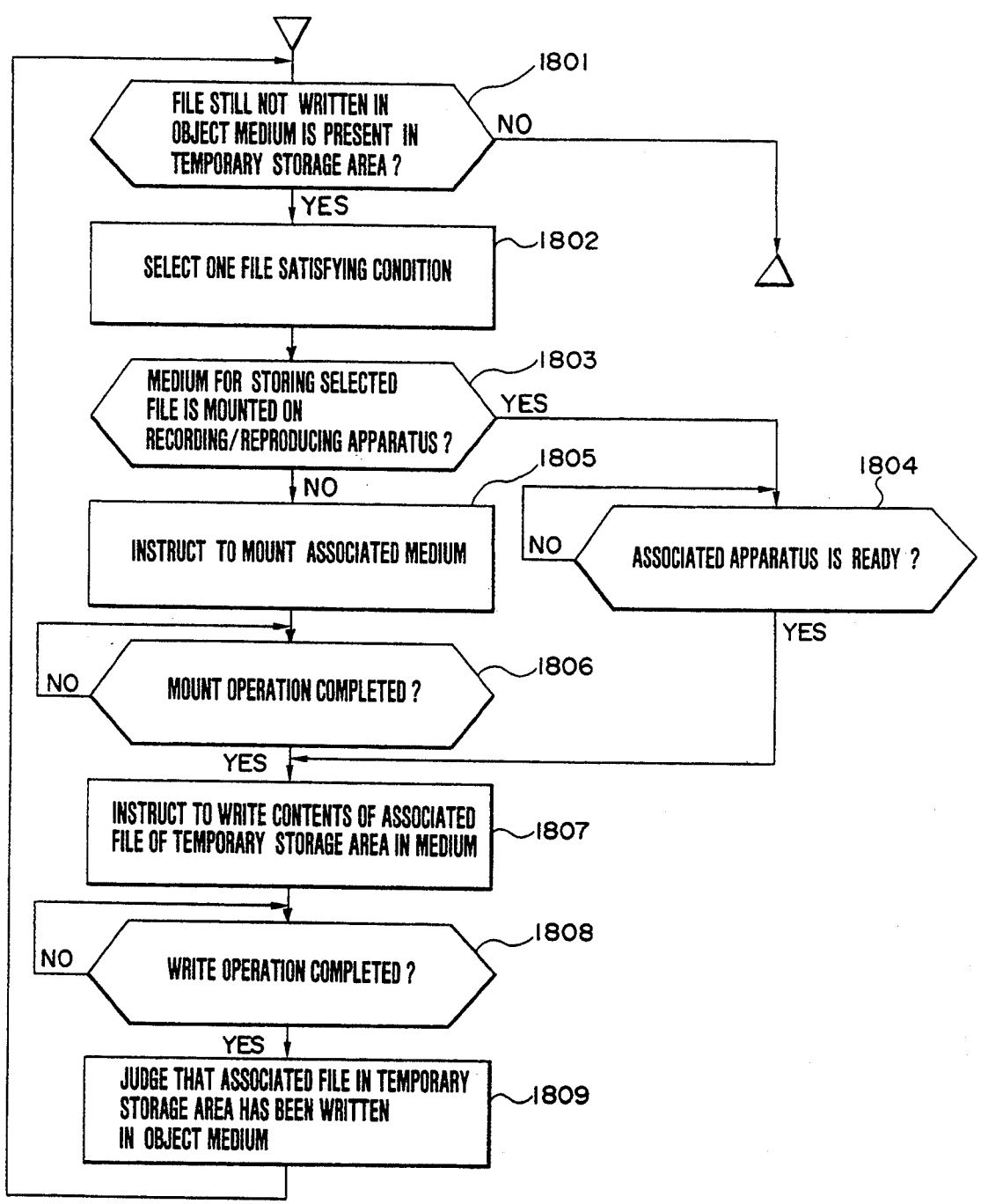
FIG. 18 illustrates the procedure of reading data from the temporary storage area and writing it in a requested medium.

The procedure of writing a file stored in the temporary storage area into an objective medium will be described with reference to FIG. 18. The procedure herein described proceeds in accordance with a user designation. This procedure is also applicable to the case where it proceeds in accordance with the job scheduling data obtained through monitoring the medium request frequency.

STEP 1801:

Upon reception of a user designation, the temporary storage area management table is referred to in order to check if there is a file still not written in the objective medium. If there is a file, the control advances to step 1802, whereas if not, the control is terminated.

STEP 1802:

There is selected one file which is not still written in the objective medium.

STEP 1803:

Referring to the recording/reproducing unit management table, it is checked whether or not a medium in which the selected file is written is mounted on a recording/reproducing unit. If the medium is mounted on the apparatus, the control advances to step 1804, whereas if not, the control advances to step 1805.

STEP 1804:

The control remains until the associated recording/reproducing unit becomes ready. Thereafter, the control advantages to step 1807.

STEP 1805:

Mounting the medium is instructed. If there is no vacant recording/reproducing unit, a vacant unit is provided in the manner as described with steps 1512 to 1515 shown in FIG. 15, and thereafter mounting the medium is instructed.

STEP 1806:

The completion of mount operation is waited for.

STEP 1807:

It is instructed that the contents of the associated file in the temporary storage should be written in the mounted medium at a predetermined address.

STEP 1808:

The completion of data writing operation is waited for.

STEP 1809:

A flag representative of data write completion in the objective medium is set at the associated record of the temporary storage area management table. The control thereafter returns to step 1801.

According to the present invention, the number of mount/demount operation steps of the information medium storage and management system can be reduced minimum. Furthermore, conflictions between a plurality of computer jobs for the same medium can also be reduced. Thus, the system having a high response performance and throughput can be realized.

What is claimed is:

1. An information media storage and management system comprising:

storage means for storing a plurality of information media, on each of which at least one file can be recorded;

means for storing a use history table storing use history data for each information medium;

a plurality of recording/reproducing units; load means for mounting a designated one of said information media from said storage means onto a selected one of said recording/reproducing units in response to an input mount instruction and demounting a designated one of the information media which are mounted on said recording/reproducing units, from a selected one of said recording/reproducing units on which the designated medium is mounted, in response to an input demount instruction; and control means responsive to a load command, (i) for designating a first one of said plurality of information media, (ii) for determining whether the first medium is already mounted, performing no operation when the first medium is determined to be mounted, (iii) for determining whether or not all of said units are occupied when the first medium is determined to be not mounted, (iv) for selecting as a first unit one of the unoccupied recording/reproducing units when it is determined that there is at least one unoccupied unit, issuing to said load means the mount instruction for mounting the first medium on the first unit to update the use history data for the first medium, (v) for selecting as a second unit one of the occupied units in accordance with the use history data for the media which occupy all the units when all said units are determined to be occupied, issuing to said load means the demount instruction for demounting the occupying medium as a second medium from the second unit to update the use history data of the second medium, and issuing to said load means the mount instruction for mounting the first medium on the second unit to update the use history data of the first medium.

2. A system according to claim 1, wherein said control means includes means for selecting said second medium in accordance with request times as the use history data when the occupying media are mounted on said plurality of units, respectively.

3. A system according to claim 1, wherein said control means includes means for selecting said second medium in accordance with request frequencies as the use history data with which the occupying media are mounted on said plurality of units, respectively.

4. A system according to claim 1, wherein said control means includes selection means for selecting said second medium in accordance with at least one of access data and schedule data in addition to said use history data for each of the occupying media, said access data indicating files to be accessed by jobs, and said schedule data concerning scheduling of an execution order of said jobs.

5. A system according to claim 4, wherein the use history data is a request time when each occupying medium is last used, 6. A system according to claim 4, wherein the use history data is a request frequency with which each occupying medium is mounted on any one of said units.

7. In an information media storage and management system, a method of managing a plurality of information media, on each of which at least one file can be recorded, the system including a plurality of recording-/reproducing units, the method comprising the steps of:
designating a first information medium to be mounted when all the recording/reproducing units are occupied;
selecting as a second information medium, to be demounted, one of a plurality of information media which occupy all said recording/reproducing units, in response to an input access command based on at least one of access data, schedule data and use history data, the access data indicating files to be accessed by jobs, the schedule data concerning scheduling of an execution order of the jobs, and the use history data indicating use history of each information medium;
demounting the second information medium from the specific unit on which the second information medium is mounted:
updating the use history data of the second information medium which was demounted;
mounting the first information media on the specific unit; and
updating the use history data of the first information medium.

8. A method according to claim 7, wherein said selecting step includes selecting said second information medium in accordance with data including request times when the information media occupying the recording/reproducing units are last used respectively as the use history data.

9. A method according to claim 7, wherein said selecting step includes selecting said second information medium in accordance with data including request frequencies with which the information media occupying the recording/reproducing units are used respectively as the use history data.

10. A method according to claim 7, wherein said selecting step includes selecting said second information medium in accordance with data including the schedule data so that the number of times of demounting and mounting of the information media accessed by the jobs is minimum.

11. A method according to claim 10, wherein said selecting step includes selecting said second information medium in accordance with data including the schedule data so that the jobs are executed in order starting from one job which will have the minimum number of times of demounting and mounting.

12. A method according to claim 10, wherein said selection means comprises means for predicting a request frequency of each information medium occupying the recording/reproducing units in accordance with said at least one access data, schedule data and use history data and selecting said second information medium in accordance with said predicted request frequencies.

13. An information media storage and management system comprising:
a plurality of recording/reproducing units each for accessing any of a plurality of information media, on each of which at least one file can be recorded;
designating means for designating one of said plurality of information media in accordance with a file to be accessed by a job, designating one of said plurality of recording/reproducing units for said designated information medium, and generating designation data which represents said designated information medium and said designated recording/reproducing unit; and
control means for outputting, when said designated information medium is mounted on one of said recording/reproducing units different from said designated recording/reproducing unit, management data representing that said designated information medium is mounted on a mount recording-/reproducing unit, and said management data further representing in use and failure of designation occurrence state for said mount recording/reproducing unit on which said designated information medium is mounted, and causing said mount recording/reproducing unit to access the designated information medium.

14. A system according to claim 13, wherein said control means further comprises means for selecting, when said designated recording/reproducing unit is occupied, as said mount recording/reproducing unit one of the unoccupied recording/reproducing units, outputting said management data to said designating means, and mounting said designated information medium on said mount recording/reproducing unit to cause said mount recording/reproducing unit to access said designated information medium.

15. A system according to claim 13, wherein said control means further comprises means for selecting, when all of said plurality of recording/reproducing units including said designated recording/reproducing units are occupied, one of the information media mounted on all of said recording/reproducing units in accordance with use history data of each information medium, demounting said selected information medium from said mount recording/reproducing unit occupied by said selected information medium, outputting said management data to said designating means, and mounting said designated information medium on said demounted recording/reproducing unit to cause said mount recording/reproducing means unit to access said designated information medium.

16. A system according to claim 13, wherein said control means further comprises:
means for selecting, when all of said plurality of recording/reproducing units including said designated recording/reproducing means are occupied and when jobs are to be executed, one of information media mounted on all of said recording/reproducing units in accordance with use history data of each information medium and access information indicating files to be accessed by said jobs, demounting said selected information medium from said mount recording/reproducing unit occupied by said selected information medium, outputting said management data to said designating means, and mounting said designated information medium on said mount recording/reproducing unit to cause said mount recording/reproducing means to access said designated information medium.

17. An information media storage and management system comprising:
a plurality of recording/reproducing units for accessing each of a plurality of information media, on each of which at least one file can be recorded;
evaluation means for evaluating the number of mount/demount operations of information media for each of jobs to be executed, based on information media mounted on said plurality of recording/reproducing units;
scheduling means for scheduling an execution order of said jobs in accordance with said evaluated numbers; and
execution means for executing said jobs in accordance with said execution order.

18. A system according to claim 17, wherein said evaluation means comprises means for evaluating said number of mount/demount operations for each job, and said scheduling means comprises means for scheduling said execution order such that said jobs are executed in the order of smaller evaluated numbers.

19. A system according to claim 17, wherein said evaluation means comprises means for evaluating sums of the numbers of mount/demount operations for combinations of said execution orders of said jobs, and said scheduling means comprises means for scheduling said execution order to ensure a minimum of said sums.

20. A system according to claim 17, wherein said scheduling means further comprises:
means for scheduling said order for executing said jobs, in accordance with said numbers and in accordance with simultaneous access to the same information medium by said jobs.

21. A data processing system including an information media storage and management system, comprising:
a plurality of recording/reproducing units each capable of accessing any one of a plurality of information media, on each of which at least one file can be recorded; and
relocation means for selectively relocating files recorded in each of information media accessed by jobs in accordance with file information representing the number of conflicts upon access to each information medium by the jobs.

22. A system according to claim 21, wherein said relocation means comprises means for selectively relocating the files to be accessed by the same job such that the files are relocated to the minimum information media.

23. A system according to claim 21, wherein said relocation means comprises means for selectively relocating the files in accordance with at least one of access information and schedule information in addition to said file information, said access information indicating the files to be accessed by jobs, and said schedule information concerning scheduling of an execution order of said jobs.

24. A system according to claim 23, wherein said relocation means comprises means for selectively relocating the files so as to allow parallel execution of said jobs, in accordance with at least one access information and schedule information in addition to said file information, said access information indicating files to be accessed by said jobs, and said schedule information concerning scheduling of an execution order of said jobs.

25. An information media storage and management system comprising:
a plurality of recording/reproducing units for accessing each of a plurality of information media, on each of which at least one file can be recorded;
buffer means for temporarily storing data, said buffer means including the information medium mounted on one of said plurality of recording/reproducing units; and
access means for storing said data in said buffer means in a write mode when a designated information medium is not mounted on any of said plurality of recording/reproducing units, thereafter writing said data in said designated information medium, and reading said data from said buffer means in a read mode.

26. A system according to claim 25, wherein said access means comprises means for monitoring at every predetermined period of time frequency of occurrence of an access request for each information medium, mounting said designated information medium on said one recording/reproducing unit when said frequency is lower than a predetermined value, and recording said data stored in said buffer means in said designated information medium.

27. A system according to claim 25, wherein said access means comprises means for mounting said designated information medium on one of said plurality of recording/reproducing units and recording said data stored in said buffer means on said designated information medium, said frequency of occurrence of access request for an information medium is judged to be smaller than a predetermined value in accordance with data regarding a job execution scheduling.

28. A system according to claim 25, wherein said access means comprises means for mounting said designated information medium on one of said plurality of recording/reproducing units and recording said data stored in said buffer means on said designated information medium, at every predetermined period of time or when a user instructs.

* * * * *

UNITED STATES PATENT AND TRADEMARK OFFICE
CERTIFICATE OF CORRECTION

PATENT NO. : 5,353,422
DATED : October 4, 1994
INVENTOR(S) : Takashi Kobayashi, et al.

It is certified that error appears in the above-indentified patent and that said Letters Patent is hereby corrected as shown below:

Claim 5, column 15, line 38, after "used" delete "," and substitute therefor --.--.

Claim 24, column 18, line 24, after "one" insert --of--.

Signed and Sealed this

Fifteenth Day of November, 1994

Attest:

BRUCE LEHMAN

Attesting Officer  Commissioner of Patents and Trademarks